T. L. BURTON.
PRESSURE RETAINING VALVE.
APPLICATION FILED MAR. 25, 1909.
1,027,987.
Patented May 28, 1912.
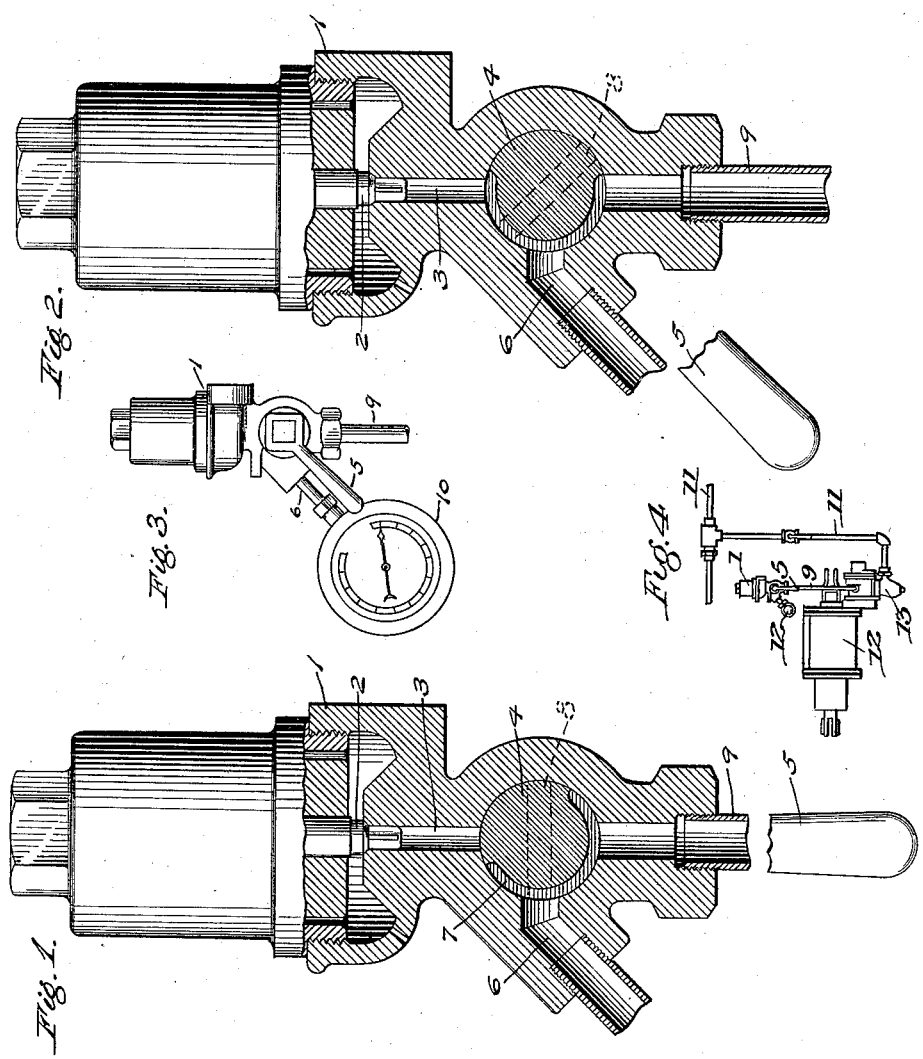

UNITED STATES PATENT OFFICE.

THOMAS L. BURTON, OF ELIZABETH, NEW JERSEY, ASSIGNOR TO THE WESTINGHOUSE AIR BRAKE COMPANY, OF PITTSBURGH, PENNSYLVANIA, A CORPORATION OF PENNSYLVANIA.

PRESSURE-RETAINING VALVE.

1,027,987.  Specification of Letters Patent.  Patented May 28, 1912.

Application filed March 25, 1909. Serial No. 485,584.

*To all whom it may concern:*

Be it known that I, THOMAS L. BURTON, a citizen of the United States, residing at Elizabeth, in the county of Union and State of New Jersey, have invented new and useful Improvements in Pressure - Retaining Valves, of which the following is a specification.

This invention relates to fluid pressure brakes and the principal object thereof is to provide improved means for testing the brake cylinder and its connections for leakage.

Heretofore it has been proposed to attach an air pressure gage to the exhaust port of the triple valve, but with this arrangement, the rate of leakage cannot be determined at pressures above fifteen pounds, or other degree at which the retaining valve device may be adjusted, and furthermore it is often difficult to readily locate leaks during the short time that the fifteen pounds is held in the brake cylinder.

According to my improvement, the retaining valve device is constructed so as to permit an air pressure gage to be temporarily attached thereto and the retaining valve cock is provided with ports whereby in one position the air pressure gage is connected with the retaining pipe and brake cylinder, so that the rate of leakage in the brake cylinder and its connections may be determined at any pressure up to the maximum brake cylinder pressure, and in another position the brake cylinder is connected with the retaining valve as well as the gage, to determine the rate of leakage when the retaining valve is cut in, as well as to indicate the degree of pressure at which the retaining valve closes.

In the accompanying drawing, Figure 1 is an elevational view, partly in section, of a retaining valve device embodying my improvement; showing the parts in one position; Fig. 2 a similar view, showing the parts in another position; Fig. 3 a view of the improved retaining valve device with an air pressure gage attached thereto; and Fig. 4 a diagrammatic view of a car air brake equipment with my improvement applied thereto.

As illustrated in the drawing, the retaining valve device may comprise the usual casing 1, containing a retaining valve 2, which is adapted to close and retain a certain amount of pressure, usually about fifteen pounds, in the brake cylinder. Outlet passage 3 from the retaining valve 2 is controlled by a cock 4, the seat of which is also provided with port openings leading to the brake cylinder retaining pipe 9 and exhaust pipe 6. The cock 4 is operated by the usual handle 5 and is provided with a through port 8 and a cavity 7. In one position, as shown in Fig. 1, the cavity 7 connects the brake cylinder retaining pipe 9 with exhaust port 6 and in another position the port 8 connects the pipe 9 with the retaining valve passage 3, so that the retaining valve device may be operated normally in the usual manner to retain a certain degree of pressure in the brake cylinder or to permit the free exhaust therefrom.

My invention has particular reference to fluid pressure brakes and is therefore shown applied to a car air brake equipment in Fig. 4 of the drawings, comprising the usual train pipe 11, brake cylinder 12, and triple valve device 13 having the retaining valve pipe 9 connected to the brake cylinder exhaust port thereof.

When it is desired to make a test for brake cylinder leakage, a suitable air pressure gage 10 is attached to the exhaust outlet 6, as shown in Fig. 3, and the handle 5 of the retaining valve device is turned to the position shown in Fig. 1, the brake cylinder and retaining pipe 9 are then connected to the air gage 10 and the rate of leakage may be determined at any pressure up to the maximum brake cylinder pressure. If the handle 5 is turned to the position shown in Fig. 2, the retaining valve passage 3 is also connected to the pipe 9 and consequently the condition of the brake cylinder and of all connections including the retaining valve with respect to leakage may be determined. In this position the gage will also indicate the degree of pressure at which the retaining valve closes.

With my improvement the brake cylinder leakage may be easily and conveniently tested at all pressures, as will be evident.

Having now described my invention, what I claim as new and desire to secure by Letters Patent, is:—

1. In a fluid pressure brake, the combination with a brake cylinder and triple valve device, of a retaining valve connected with the usual brake cylinder exhaust port of the triple valve device, an air pressure gage, and a cock having means for connecting said brake cylinder exhaust port with the retaining valve in one position, with the air pressure gage in another position, and with both the retaining valve and pressure gage in still another position.

2. In a fluid pressure brake, the combination with a brake cylinder and triple valve device, of a retaining valve connected with the usual brake cylinder exhaust port of the triple valve device, a cock having ports for connecting said brake cylinder exhaust port with the retaining valve in one position, to an atmospheric exhaust port in another position, and to both the retaining valve and the atmospheric port in still another position, and an air pressure gage adapted to be connected to said atmospheric port.

3. In a fluid pressure brake, the combination with a brake cylinder and triple valve device, of a retaining valve connected with the usual brake cylinder exhaust port of the triple valve device, an air pressure gage, and a cock for controlling communication from said brake cylinder exhaust port, to both the retaining valve and the pressure gage in one position and to said gage only, in another position.

4. In a fluid pressure brake, the combination with a brake cylinder, a triple valve device, and a pressure retaining valve connected to the usual brake cylinder exhaust port of the triple valve device for retaining a predetermined degree of pressure in the brake cylinder, of an air pressure gage and a cock having a port adapted to connect the brake cylinder exhaust port with the retaining valve only, in one position, and having another port for connecting the brake cylinder exhaust port with the pressure gage only, in another position, said cock having a third position in which the brake cylinder exhaust port is connected both to the pressure gage and to the retaining valve.

In testimony whereof I have hereunto set my hand.

THOMAS L. BURTON.

Witnesses:
JOHN K. LARGE,
W. M. INTDST.

---

Copies of this patent may be obtained for five cents each, by addressing the "Commissioner of Patents. Washington, D. C."